S. BARKER & H. S. PRATT.

ROLLED SHEET-METAL.

No. 7,198. Reissued July 4, 1876.

Witnesses

R. H. Gaylord

J. R. Witting

Inventors

Silas Barker

Henry S. Pratt

By W. R. Simmons

Atty

N. PETERS, PHOTO-LITHOGRAPHER, WASHINGTON, D.C.

UNITED STATES PATENT OFFICE.

SILAS BARKER AND HENRY S. PRATT, OF HARTFORD, CONNECTICUT; SAID PRATT ASSIGNOR TO SAID BARKER.

IMPROVEMENT IN ROLLED SHEET METAL.

Specification forming part of Letters Patent No. 107,752, dated September 27, 1870; reissue No. 7,198, dated July 4, 1876; application filed December 11, 1875.

*To all whom it may concern:*

Be it known that we, SILAS BARKER and HENRY S. PRATT, of Hartford, in the county of Hartford and State of Connecticut, have invented a new and useful Improvement in Sheet Metals, of which the following is a specification, reference being had to the accompanying drawings, where—

Figure 2:
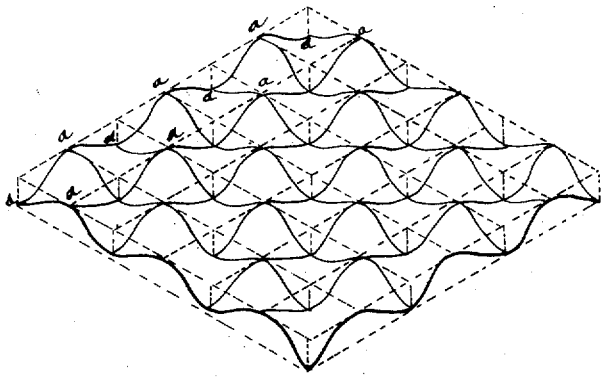
Figure 1:
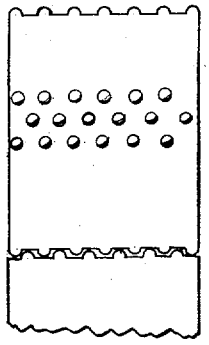

Figure 1 shows the construction of the rolls, and Fig. 2 is a perspective view, very much enlarged for illustrating our improvement.

The invention relates to an improvement in rolled sheet metals, such as sheet-iron for making stoves, and in sheet metals for other purposes.

The invention consists in giving to the sheet metal during the process of rolling an indented surface, thus producing an improved article of manufacture.

We construct the rolls by cutting the surface of one into any desirable figure, regular or irregular, and the other roll the reverse of the first, so that the projections upon one correspond to the recesses of the other, and vice versa, as seen in Fig. 1. Through the roller thus constructed we pass the sheet metal after it has been reduced to the proper thickness, by which operation the metal is indented, corresponding to the construction of the rolls, producing upon the metal an uneven surface, as seen in Fig. 2. The heavy lines denote longitudinal and transverse sections. The finer lines are drawn longitudinally and transversely through the depressions and over the projections or raised portions. The broken lines denote the diagram of the plain surface of the sheet before operation, the raised portions and depressions alternating with each other, *a* being the center of the raised points, and *d* the center of the depressions. This representation is increased in dimensions very greatly over the practical construction; but this is necessary to fully illustrate the invention.

We claim as our invention—

As a new article of manufacture, sheet metal, the surfaces of which are correspondingly raised and indented, substantially in the manner, and for the purposes set forth.

SILAS BARKER.
HENRY S. PRATT.

Witnesses:
WM. EDGAR SIMONDS,
ROBT. F. GAYLORD.